United States Patent

[11] 3,573,881

| [72] | Inventor | Charles Arthur Griffin<br>Barnet Green, England |
|---|---|---|
| [21] | Appl. No. | 805,176 |
| [22] | Filed | Mar. 7, 1969 |
| [45] | Patented | Apr. 6, 1971 |
| [73] | Assignee | Moulton Developments Limited<br>Bradford-on-Avon, England |
| [32] | Priority | Mar. 14, 1968 |
| [33] | | Great Britain |
| [31] | | 12,450/68 |

[54] MOTOR VEHICLE SUSPENSION SYSTEMS
4 Claims, 4 Drawing Figs.

[52] U.S. Cl. .................................................. 280/96.2,
267/65
[51] Int. Cl. .................................................. B60g 11/26
[50] Field of Search .......................................... 280/96.2,
96.3, 96.22, 124; 267/65

[56] References Cited
UNITED STATES PATENTS

| 2,916,296 | 12/1959 | Muller | 280/96.2 |
| 3,020,968 | 2/1962 | Sampietro | 280/124.1 |

FOREIGN PATENTS

| 1,102,577 | 3/1961 | Germany | 280/96.22 |

*Primary Examiner*—Philip Goodman
*Attorney*—Shoemaker & Mattare

ABSTRACT: This invention provides for an automotive vehicle a suspension arrangement with a trailing or semitrailing arm controlled by an hydraulic displacer unit, in which the trailing arm has at the outer end of its leading part, a flexible mounting allowing both pivotal and compliance movement to the arm, and at the inner end of the leading part, a depending crank arm acted on by an hydraulic displacer unit, and wherein said inner end is supported for both pivotal and compliance movement by a knuckle-type bearing situated so that its center lies in the vertical plane of thrust of the hydraulic displacer unit.

INVENTOR
CHARLES ARTHUR GRIFFIN
BY
Shoemaker and Mattare
ATTORNEYS

MOTOR VEHICLE SUSPENSION SYSTEMS

This invention relates to wheel suspensions for automotive vehicles.

The invention has exclusive reference to suspensions of the kind in which each wheel is individually carried on a trailing or semitrailing arm which is supported at its leading part for pivotal movement about an axis extending generally transversely of the vehicle by, firstly, an outer pivotal mounting attached to the vehicle sprung structure towards the side of the vehicle and, secondly, an inner pivotal mounting attached to a central region of the vehicle sprung structure, there being an hydraulic displacer unit arranged to control pivotal movement of the trailing arm and acting on it through the medium of a depending crank arm located adjacent said inner pivotal mounting.

A depending crank is necessary if the hydraulic displacer unit acting on it is to be located at a low level, for example, in a rear suspension so as to be beneath the passenger or luggage space of the vehicle.

A desirable attribute of any motor vehicle suspension system is that it should possess a controlled degree of compliance especially in the fore-and-aft longitudinal direction in order to reduce harshness of ride.

For this reason, it has been proposed that both the inner and outer bearings by which the leading part of the trailing arm is pivotally connected to the sprung structure, should include flexible resilient bushings so as to allow a degree of rocking movement to, so to speak, the pivotal axis of the arm.

In such systems then, the trailing arm is permitted two distinct types of movement both of which are resiliently controlled or limited. The first of these which we term in this specification "pivotal movement" is that in which the arm performs a partial rotation about its leading end. This occurs as the associated wheel rises or falls relative to the vehicle sprung structure. The second type of movement, which in this specification we term "compliance movement", is that in which the arm moves so that the axis of the pivotal movement is itself displaced. When this occurs, the associated wheel may move fore or aft longitudinally of the vehicle sprung structure, or inwardly or outwardly thereof, or any combination of these. These amplitude of the deflections in compliance movements of the trailing arm are much smaller than those in pivotal movements.

The bushing at the inner end of the arm has to sustain, in addition to the loading derived exclusively from the trailing arm, a high loading transmitted through the adjacent crank arm from the hydraulic displacer unit which controls pivotal movement of the trailing arm. This loading may amount to several thousands of pounds and militates against affording more than a minimal degree of flexibility to the bushing associated with the inner bearing. In other words, the leading part of the arm has at its inner end, bearing means which are so stiff that they strongly resist compliance movement of the arm while the bearing means at the outer end of the arm, even though they may include bushings of great flexibility, are subjected to an adverse restraint so that the degree of compliance movement obtained for the arm, particularly in the fore-and-aft longitudinal direction, is below optimum.

According to this invention, a motor vehicle suspension of the hydraulic displacer controlled trailing or semitrailing arm type specified, is characterized in that the leading part of the arm at its inner end is supported for pivotal and compliance movement by a knuckle-type bearing situated so that its center lies in the vertical plane of thrust of the hydraulic displacer unit controlling pivotal movement of the trailing arm. By this arrangement, it is possible to employ a flexible bearing means at the outer end of the leading part of the trailing arm such as will allow turning of the pivotal axis of the arm about said knuckle-type bearing to give optimum compliance movement.

Preferably, according to the invention, the leading part of the trailing or semitrailing arm has, at its inner end, a socket in which engages a ball. The ball may be connected rigidly with respect to the vehicle sprung structure, in which case all compliance movement of the trailing arm will be in the form of turning movement about a fixed point on the vehicle.

Alternatively, the ball may be connected to the vehicle sprung structure through the medium of a flexible mounting, in which case, the ball itself will be permitted a limited degree of movement allowing in turn further compliance movement of the trailing arm.

The invention will be further described with reference to the accompanying drawings in which.

Figure 1:
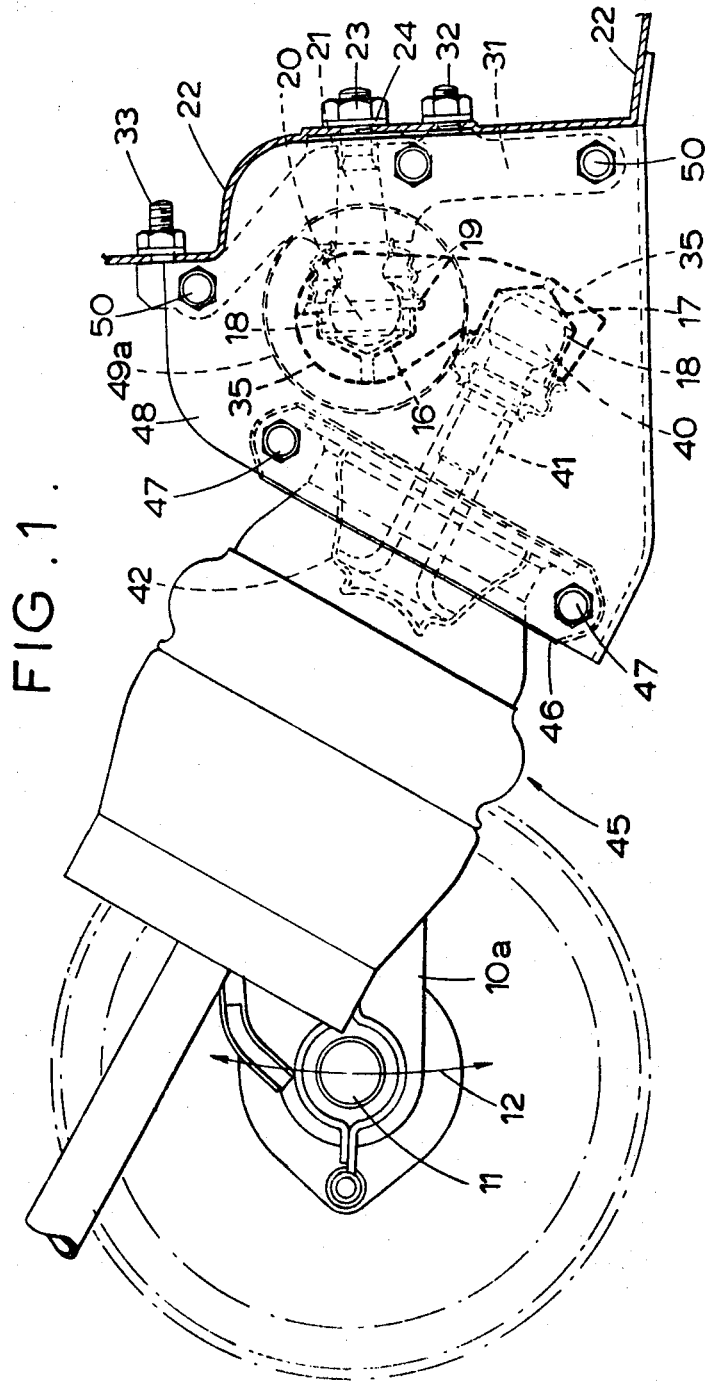
FIG. 1 is a part sectional side view of a rear suspension arrangement according to a first embodiment of the invention in which the ball of the knuckle joint is mounted rigidly with respect to the vehicle sprung structure.

In the drawings, 10 represents a trailing arm mounting at its rear end 10a the hub 11 of a vehicle wheel.

The leading end 10b of the trailing arm 10 is mounted for pivotal and compliance movement relative to the vehicle sprung structure 22 by means described below. The pivotal axis extends generally transversely of the vehicle. Such axis may be inclined at a small angle to the horizontal plane and it need not be perpendicular to the longitudinal centerline of the vehicle. However, in the embodiment illustrated in FIGS. 1 and 2, the pivotal axis is generally perpendicular to the longitudinal centerline of the vehicle indicated at 25 in FIG. 2.

The leading part 10b of the arm 10 has an outer end 13 and an inner end 14. The outer end 13 is connected to the vehicle sprung structure 22 by bearing means generally designated 15. Such bearing means are such as to permit pivotal movement of the arm as indicated by arrow 12 in FIG. 1. Further, such bearing means 15 include a flexible resilient bushing permitting articulation about the center of a ball 20.

Figure 2:
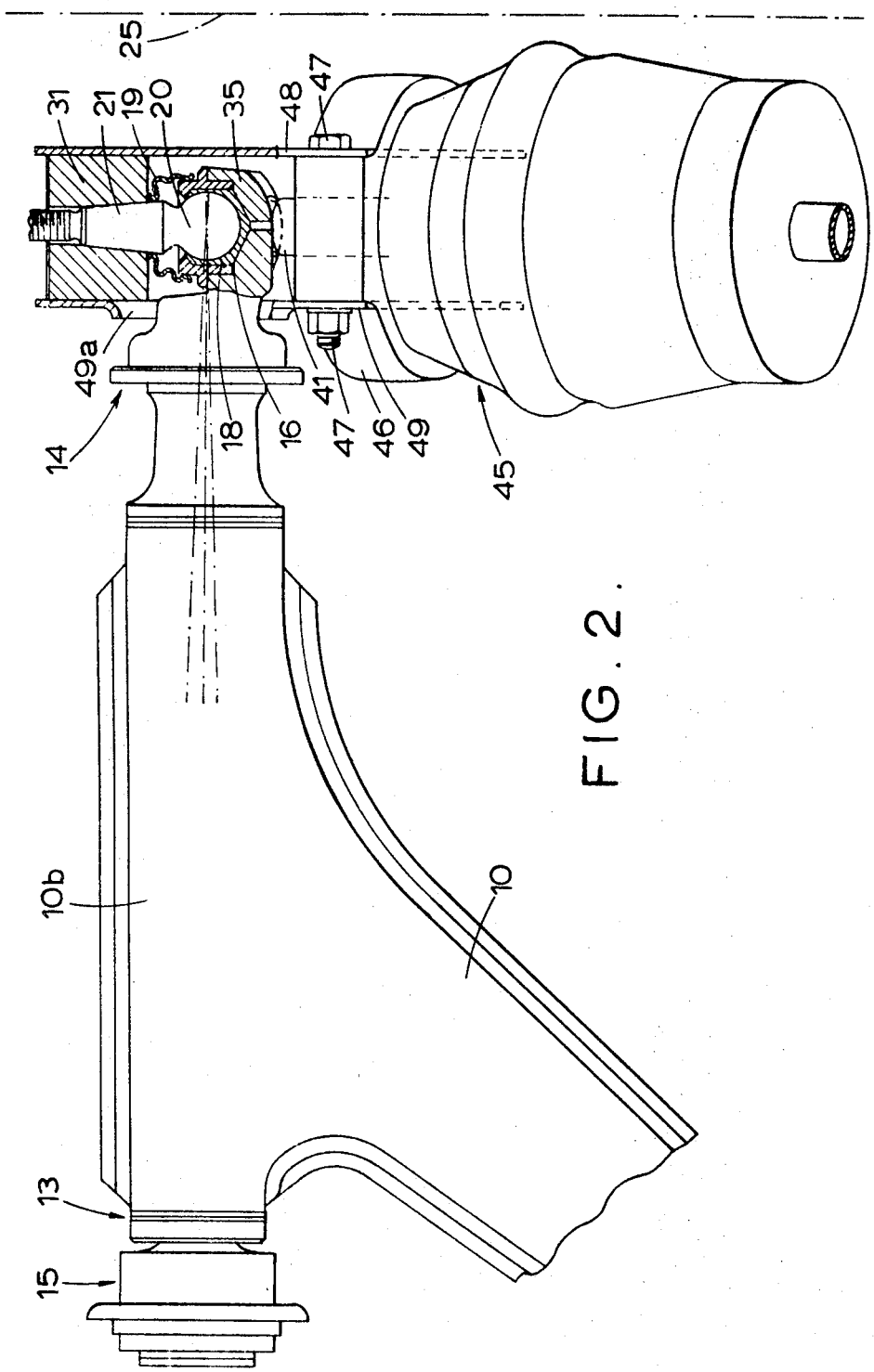
FIG. 2 is a part sectional plan view of this arrangement.

Referring now to FIGS. 1 and 2, the ball 20 has a spigot 21 which passes through a plate 31 and into an aperture on the vehicle sprung structure 22 (in FIG. 1) where it is anchored by a nut 33 with an intervening washer 24. It will be noted that the spigot 21 is conically tapered and that the plate 31 has an aperture tapered to receive the spigot. The plate 31 is secured to the sprung structure 22 by further bolts 32 and 33 each with a nut and a washer.

The leading part 10b of the arm 10 has at its inner end 14 a depending crank 35. Formed in the depending crank 35 are upper and lower sockets 16 and 17 respectively, each of which lie in substantially the same vertical plane and each of which has a liner 18 of nylon or analogous bearing material which is preferably a so-called "self lubricating" material.

The upper socket 16 receives the ball 20 to form a knuckle joint affording for the arm 10 pivotal movement and also compliance movement about the center of the ball 20. A flexible gaiter 19 keeps dirt out of the knuckle joint.

The socket 17 at the lower end of the depending crank arm 35 received a ball 40 connected to a strut 41 of a piston 42. The piston 42 forms part of an hydraulic displacer unit generally designated 45 arranged to act on the crank arm 35 to control pivotal movement of the trailing arm 10.

The housing of the displacer unit 45 is clamped by an encircling ring 46 with bolts 47 to two plates 48 and 49 which are in turn clamped to the plate 31 by bolts 50. The outer plate 49 has a large aperture at 49a to allow free clearance to the inner end 14 of the arm 10.

In this embodiment the knuckle joint constituted by the ball 20 and socket 16 is situated so that the center of articulation lies in the vertical plane of action of the displacer unit 45, that is the vertical plane in which lies the longitudinal axis of the strut 42. In this way forces derived from the displacer unit 45 will not impede the compliance afforded by the outer flexible bearing means 15, to the trailing arm 10.

In the arrangement shown in FIGS. 1 and 2 compliance movement of the trailing arm 10 is in the form of turning movement about the center of the ball 20, which is fixed rigidly to the vehicle sprung structure 22.

Figure 3:
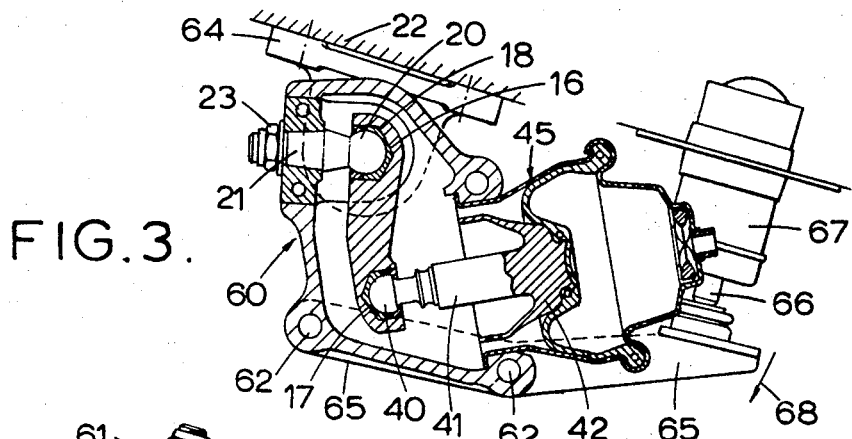
FIG. 3 is a part sectional side view of a second arrangement of a rear suspension and in this embodiment the ball of the knuckle joint is itself resiliently mounted.
Figure 4:
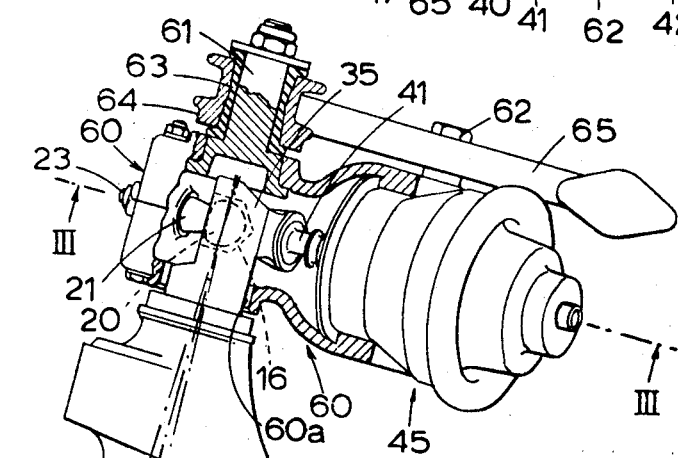
FIG. 4 is a plan view of the arrangement shown in FIG. 3.

In FIGS. 3 and 4 an arrangement is shown in which the ball 20 is mounted on the sprung structure through the medium of a flexible resilient bushing, and in FIGS. 3 and 4 similar reference numerals are employed for like or equivalent parts to those already described with reference to FIGS. 1 and 2.

In this second embodiment the trailing arm 10 has its outer end 13 carried by flexible bearing means 15 and its inner end 14 supported for pivotal and compliance movement about the center of a ball 20.

The arm 10 has a depending crank 35 on which acts the piston 42 of an hydraulic displacer unit 45. The piston has a strut and a ball 40 received in a socket 17 in the lower end of the crank 35.

However, in this embodiment, the spigot 21 of the ball 20 is fixed to a composite housing generally designated 60. This housing 60 has attached to or integral with it, a laterally projecting journal 61 which is attached to or integral with it, a laterally projecting journal 61 which is attached to the sprung structure 22 of the vehicle through a flexible resilient bush 63 within a clamp bracket 64 bolted to the structure 22.

The composite housing 60 is connected to and mounts the displacer unit 45, and to absorb torque on the housing 60 there is connected to it, by bolts at 62, a torque arm 65.

The torque arm 65 extends rearwardly and may be connected to the sprung structure 22 with an intervening flexible mounting. Alternatively and as indicated in FIG. 3, the rear end of the torque arm may be acted on by a ram 66 of a levelling device generally designated 67. The device 67 is mounted on the vehicle sprung structure 22 preferably resiliently. The ram 66 may be operated to move torque arm 65 from the position shown, in the direction indicated by the arrow 68 in FIG. 3 and such movement will cause pivotal rotation of the journal 61 relative to the clamp bracket 64 and will be permitted by the resilient bush 63. Such movement of the torque arm 65 may be employed to adjust the trim height of the vehicle sprung structure.

The housing 60 substantially encloses the crank 35 against ingress of dirt to the sockets 16 and 17, except that there is an opening 60a affording clearance for the inner end 14 of the arm 10. However, this opening may be provided with a protective flexible gaiter.

In the embodiment illustrated in FIGS. 3 and 4, the clamp bracket 64 is aligned with a clamp bracket 70 of the outer bearing means 15 and these two brackets will limit the articulation allowed to the pivotal axis of the arm 10. Such pivotal axis is in this embodiment inclined to the longitudinal centerline of the vehicle.

The clamp bracket 70 which is fixed to the vehicle sprung structure, surrounds a resilient bush 71. A journal 72 of arm 10 passes through the bush 71 there being intervening bearing sleeves.

It will be appreciated that the arm 10, the crank 35 and the journal 72 may be either an integral or a composite structure. For example, the crank 35 and the journal 72 may be arranged at the opposite ends of a shaft passing through the leading part 10b of the arm 10 and in splined or keyed connection therewith.

In both embodiments of the invention illustrated in the drawings, the inner end 14 of the arm 10 is supported for compliance movement by a knuckle joint constituted by the ball 20 received in socket 16. As the ball 20 is situated in the vertical plane of thrust of the hydraulic displacer unit 45, (that is the vertical plane containing the longitudinal axis of the strut 41), the displacer unit will not impose significant forces impeding compliance movement of the arm 10 as permitted by the outer bearing means 15. Thus the outer bearing means 15 can be arranged to afford optimum compliance for the arm 10, particularly in the fore-and-aft longitudinal direction.

I claim:

1. A trailing or semitrailing arm suspension arrangement of the kind specified in which the arm has at the outer end of its leading part, a flexible mounting allowing both pivotal and compliance movement to the arm, and at the inner end of the leading part, a depending crank arm acted on by an hydraulic displacer unit, and wherein said inner end is supported for both pivotal and compliance movement by a knuckle-type bearing situated so that its center lies in the vertical plane of thrust of the hydraulic displacer unit.

2. A suspension arrangement according to claim 1, wherein the knuckle-type bearing comprises a ball-and-socket joint with the ball attached rigidly with respect to the sprung structure of the vehicle.

3. A suspension arrangement according to claim 1, wherein the knuckle-type bearing comprises a ball-and-socket joint with the ball being carried on a rigid member which in turn is connected to the sprung structure through the medium of a resilient mounting.

4. A suspension arrangement according to claim 3, wherein the rigid member is a casing which also mounts the hydraulic displacer unit and shrouds the depending crank.